United States Patent
Davis et al.

(10) Patent No.: US 9,112,350 B2
(45) Date of Patent: Aug. 18, 2015

(54) POWER SUPPLIES WITH TESTABLE CURRENT LIMITERS, AND METHODS OF OPERATING SAME

(75) Inventors: Bruce M Davis, Westminster, CO (US); Raymond Druce, Salt Lake City, UT (US); James Holden, Sandy, UT (US)

(73) Assignee: Moog Inc., East Aurora, NY (US)

( * ) Notice: Subject to any disclaimer, the term of this patent is extended or adjusted under 35 U.S.C. 154(b) by 975 days.

(21) Appl. No.: 13/123,863

(22) PCT Filed: Oct. 31, 2008

(86) PCT No.: PCT/US2008/012354
§ 371 (c)(1),
(2), (4) Date: Apr. 12, 2011

(87) PCT Pub. No.: WO2010/050917
PCT Pub. Date: May 6, 2010

(65) Prior Publication Data
US 2011/0194217 A1 Aug. 11, 2011

(51) Int. Cl.
*H02H 9/00* (2006.01)
*H02H 3/04* (2006.01)

(52) U.S. Cl.
CPC ..................................... *H02H 3/044* (2013.01)

(58) Field of Classification Search
CPC ............. H02H 7/00; H02H 9/00; H02M 1/32; H02P 29/028; Y02T 10/642; Y02T 10/7005; F04D 27/004
USPC .......... 318/138, 254, 317, 334, 434, 435, 439, 318/472, 801, 811; 361/1, 18, 23; 363/41, 363/55, 56; 323/365
See application file for complete search history.

(56) References Cited

U.S. PATENT DOCUMENTS

| | | | |
|---|---|---|---|
| 3,868,554 A * | 2/1975 | Konrad | 318/434 |
| 4,611,154 A * | 9/1986 | Lambropoulos et al. | 318/490 |
| 4,819,117 A * | 4/1989 | Brennan et al. | 361/18 |
| 5,457,364 A * | 10/1995 | Bilotti et al. | 318/434 |
| 5,847,523 A * | 12/1998 | Rappenecker et al. | 318/434 |
| 6,078,154 A * | 6/2000 | Manlove et al. | 318/293 |
| 7,768,339 B2 * | 8/2010 | Suzuki | 327/513 |
| 7,834,578 B2 * | 11/2010 | Sato | 318/800 |
| 2007/0158121 A1 * | 7/2007 | Sato | 180/65.3 |
| 2009/0219654 A1 * | 9/2009 | Fitzpatrick | 361/18 |
| 2012/0268852 A1 * | 10/2012 | Rogoff | 361/93.4 |
| 2013/0134985 A1 * | 5/2013 | Bernardon | 324/527 |

* cited by examiner

*Primary Examiner* — Kawing Chan
(74) *Attorney, Agent, or Firm* — Phillips Lytle LLP

(57) ABSTRACT

A power supply (20) for providing a desired current to an electric load (23) broadly comprises: a current limiter (21) for providing a desired current; a current sensor (28) for determining the actual current supplied by the current limiter and providing a feedback signal (30, 31) to the current limiter for causing the current limiter to reduce the error between the desired and the actual currents; and a test circuit (24) for temporarily changing the actual current sensed by the current sensor to a level different from the desired current for causing the current limiter to adjust the magnitude of the current provided thereby; whereby the operation of the power supply may be tested. The invention also provides an improved method of operating such a power supply.

22 Claims, 2 Drawing Sheets

POWER SUPPLIES WITH TESTABLE CURRENT LIMITERS, AND METHODS OF OPERATING SAME

TECHNICAL FIELD

The present invention relates generally to power supplies with current-limiting for electrical loads, and methods of operating same. The present invention also relates to power supplies for electric motors with a torque-limiting capability, and to methods of operating same.

BACKGROUND ART

Prior power supplies have made use of current-limiting circuitry. For example, U.S. Pat. No. 5,457,364 discloses an electric motor driver with a current-limiting mechanism. However, no known prior art power supply system has made use of an in-circuit method of rapidly testing whether the current-limiting circuitry was functioning correctly. In order to test whether the current-limiting circuitry was properly cutting back current at the appropriate value, external equipment, such as voltage and/or current probes, needed to be attached test the power supply.

It is also known that electric motor systems have employed mechanical torque limiters. However, such torque limiters are unreliable, take up space, are heavy, and/or are not cost effective. Further, the functionality of such systems cannot be easily verified in the field.

DISCLOSURE OF THE INVENTION

With parenthetical reference to corresponding parts, portions or surfaces of the disclosed embodiment, merely for purposes of illustration and not by way of limitation, the present invention provides power supplies for providing a desired current to an electric load that is adapted to easily self-test the current-limiting functionality of the power supply, and to methods for operating such power supplies.

The power supply (20) broadly comprises: a current limiter (21) for providing a desired current; a current sensor (28) for determining the actual current supplied by the current limiter and providing a feedback signal (30, 31) to the current limiter for causing the current limiter to reduce the error between the desired and the actual currents; and a test circuit (24) for temporarily changing the actual current sensed by the current sensor to a level different from the desired current for causing the current limiter to adjust the magnitude of the current provided thereby; whereby the operation of the power supply may be tested.

The current sensor may include at least one resistor (40, 41), and may also produce more than one feedback signal (30, 31).

The current limiter may include a differential amplifier (45) which is configured to measure the difference between two feedback signals (30, 31).

The current limiter may include a first transistor (67). The current limiter may further include a second transistor (64) for driving the first transistor.

The current limiter may include a comparator circuit (54).

The current limiter may further include a reference voltage (15) as an input to the comparator circuit.

The current limiter may include a one-shot pulse generator (60) configured to shut off the power supply for a period of time after the actual current is found to be greater than the desired current.

The power supply may further include a low-pass filter configured to filter the current sensor feedback signal.

The test circuit may include a transistor (74), which may be adapted to rapidly ground the electrical load when the actual current is greater than the desired current.

The test circuit may include an operational amplifier circuit (85). The operational amplifier circuit may include a reference voltage (86).

The electric load may be an electric motor (23).

The power supply may further include a torque sensor (100) configured to measure the torque output of the electric motor and to provide a second feedback signal (101) to the current limiter for causing the current limiter to adjust its current output if the second feedback signal is not within a desired range.

In another aspect, the invention provides an improved method of operating a power supply (20) to an electric load (23) that has a current limiter (21) for providing a desired current, a current sensor (28) for determining the actual current supplied by the current limiter, and a feedback signal (30, 31) provided from the current sensor to the current limiter to allow the current limiter to reduce the error between the desired and the actual currents. The improvement broadly comprises the steps of: providing a test circuit (24); operating the test circuit to temporarily change the actual current sensed by the current sensor to a level different from the desired current; and determining that the current limiter properly adjusts in response to operation of the test circuit; thereby to test the operational integrity of the power supply.

The step of providing a test circuit may include the step of placing a transistor (74) in parallel with the electric load.

The step of providing a test circuit may include using an operational amplifier circuit (85) with feedback to control the operation of the test circuit.

The step of operating the test circuit may further include the steps of: providing a reference voltage (86); comparing the reference voltage to the feedback signal (31) to provide a result; and adjusting the current flowing to the current sensor as a function of the result.

The step of providing the test circuit may further include the step of: activating the transistor (74) of the test circuit when the actual current is greater than the desired current in order to rapidly reduce the electrical drive to the electrical load.

The electric load may include an electric motor, and the power supply may further include the steps of: measuring the output torque of the electric motor with a torque sensor (100); providing a second feedback signal (101) from the torque sensor to the current limiter; and adjusting the current flowing from the current limiter as a function of the second feedback signal.

Accordingly, the general object of the invention is to provide an improved power supply, having a testable current limiter, for an electric load, such as an electric motor.

Another object is to provide a current-limiting power supply which can be easily tested.

Another object is to provide a fault-tolerant current-limiting power supply.

Another object is to provide a power supply for an electric motor which limits the maximum torque delivered by the electric motor.

Another object is to provide a power supply for an electric motor which limits the maximum torque delivered by the electric motor, which power supply is lighter and more reliable than mechanical torque limiters would allow.

Another object is to provide a method of testing a power supply that has a current limiter by providing a test circuit.

These and other objects and advantages will become apparent from the foregoing and ongoing written specification, the drawings, and the appended claims.

DESCRIPTION OF PREFERRED EMBODIMENTS

Figure 1:
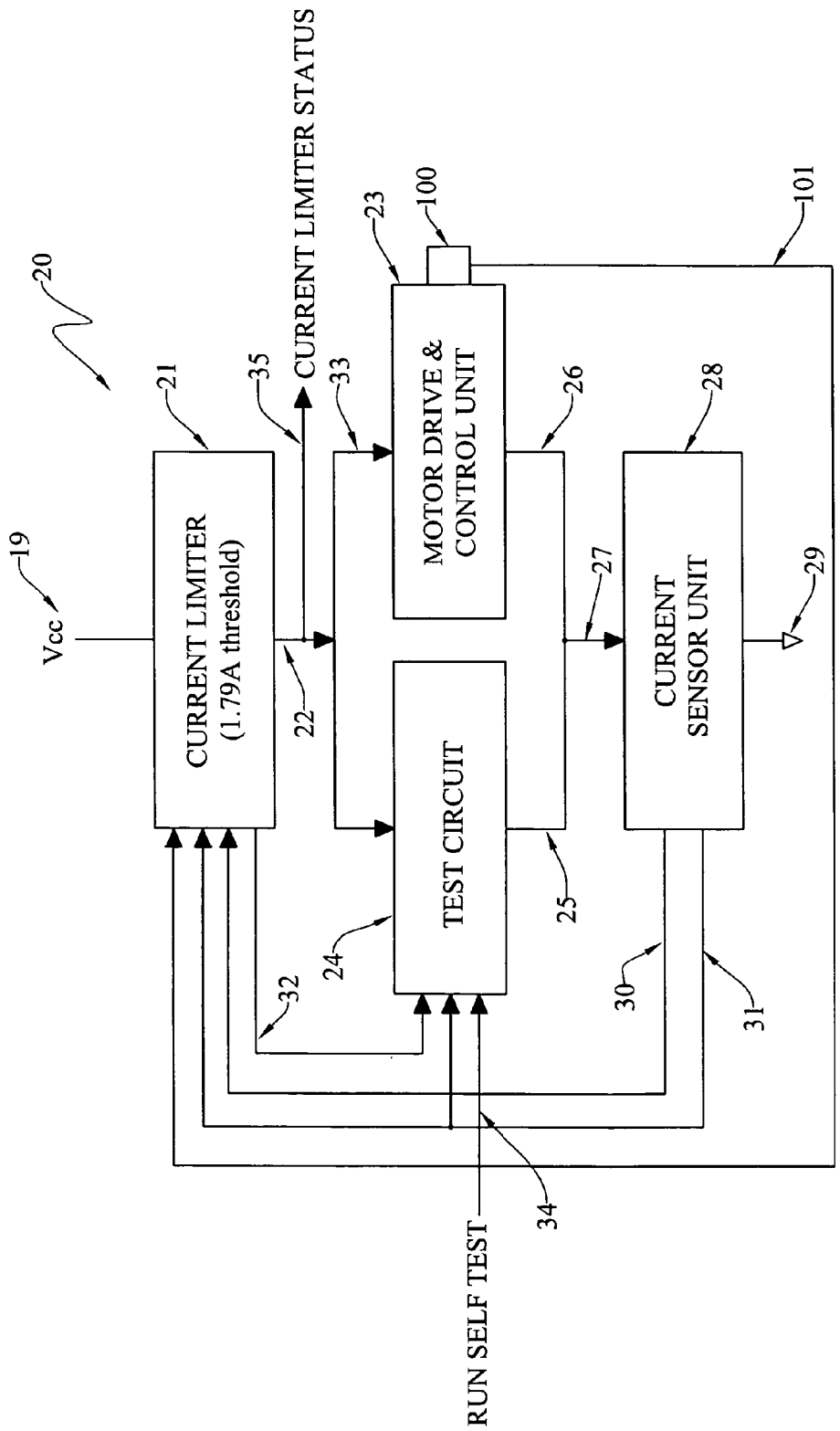
FIG. 1 is a block diagram of a first embodiment of the present invention.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and more particularly to FIG. 1 thereof, this invention provides an improved power supply, of which a first embodiment is generally indicated at 20. As shown, power supply 20 generally includes a voltage source 19 which provides power to a current limiter 21. The power output 22 of the current limiter 21 provides current to a motor drive and control unit 23 and to a test circuit 24. The status of whether current limiter 21 is actively providing power is read and indicated by the current limiter status line 35. The test circuit's output 25 and the motor drive and control unit's output 26 are connected to the input 27 of a current sensor unit 28.

The current sensor unit 28 is connected to ground 29. All current flowing from the current limiter 21 will pass through the current sensor unit. The current sensor unit 28 will measure the total amount of current passing through it to ground, which is equivalent to the total actual current supplied by the current limiter 21. The current sensor unit 28 will output the magnitude of the current measurement on the hi- and lo- feedback signals 30, 31, respectively, which are provided to the current limiter 21. Feedback signal 31 is also provided to the test circuit 24.

The current limiter 21 compares the actual current measurement, represented in feedback signals 30, 31, to a predetermined desired current level. If the actual current is greater than the desired current level, then the current limiter 21 will cut off its current output for a period of time, and will indicate this status through an overcurrent output signal 32 which connects to the test circuit 24. Upon receiving the overcurrent signal 32, the test circuit may help reduce the current flow from the current limiter 21 into the motor drive and control unit 23 by providing a low resistance path from the current limiter 21 to the current sensor unit 28. The test circuit's low resistance path to ground also effectively provides the input 33 of the motor drive and control unit 23 with a path to ground, which may be important if the motor drive and control unit is a highly inductive or capacitive load.

The test circuit 24 also contains an input to read a run self-test control signal 34. When active, the run self-test signal will cause the test circuit 24 to draw current from the current limiter 21. This will cause a current greater than the desired current level to flow from the current limiter 21, through the test circuit 24, and through the current sensor unit 28 to ground. The test circuit 24 will ensure that the actual current flowing in the current sensor unit 28 is greater than the desired current level. The current sensor unit will measure the actual current, and indicate its magnitude on feedback signals 30, 31, which will relay the information to the current limiter 21. The current limiter will compare the actual current measurement value on the feedback signals to the desired current level and see that the actual current level is greater than the desired current level. This will cause the current limiter 21 to shut off its current output, which is indicated by the current limiter status line 35.

Figure 2:
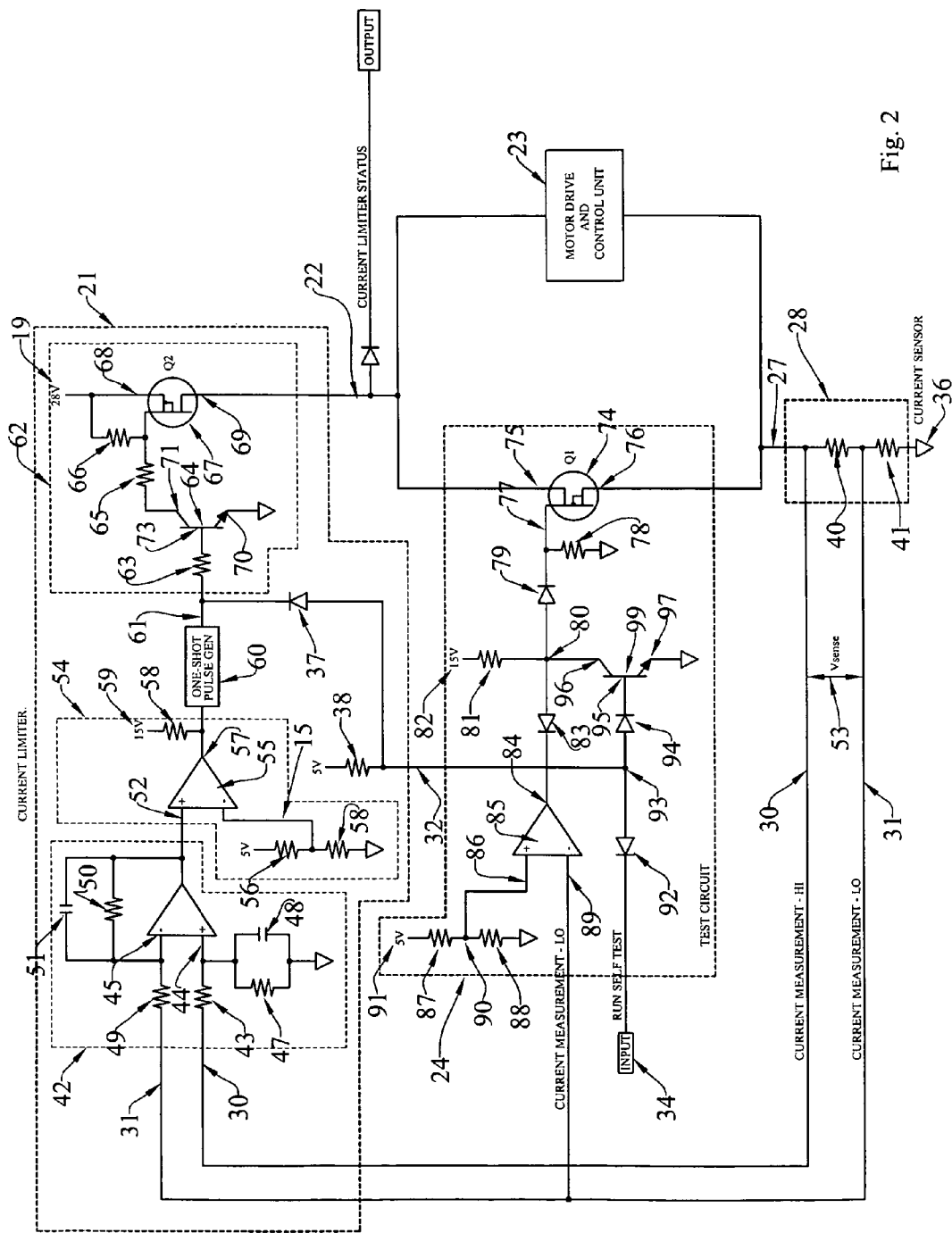
FIG. 2 is a circuit diagram of the first embodiment shown in FIG. 1.

As shown in FIG. 2, the current sensor unit 28 may be implemented as a first resistor 40 connected in series with a second resistor 41, which is then connected to ground 36. The current sensor resistors 40, 41 should have a low resistance, such as 1 ohm, to ensure that the current sensor unit does not dissipate much power. The voltage at the input of the first resistor is used as one of the feedback signals 30, and the voltage at the input to the second resistor is used as a second feedback signal 31. The feedback signals 30, 31 are supplied as inputs to a differential amplifier circuit 42 within the current limiter 21. The differential amplifier circuit 42 provides a high impedance to feedback signals 30, 31 such that very little current is drawn by the feedback signals 30, 31 from the current sensor unit 28. This ensures that the voltage on feedback signals 30, 31 is an accurate representation of the current that passes through the first resistor 40 and the second resistor 41 of the current sensor unit 28.

The first feedback signal 30 is connected to a resistor 43 with a high resistance, such as 10K ohms, which is then connected to the positive input 44 of an operational amplifier 46. The positive input 44 of the operational amplifier is then connected to a 1K ohm resistor 47 in parallel with a capacitor 48 which are then connected to ground. The second feedback signal 31 is connected to a resistor 49 with a high resistance, such as 10K ohms, which is then connected to the negative input 45 of the operational amplifier 46. The negative input of the operational amplifier is then connected to a 1K ohm resistor 50 in parallel with a capacitor 51, which are then connected to the operational amplifier output 52.

The differential amplifier circuit 42 achieves several purposes. First, it provides a high impedance to feedback signals 30, 31 such that very low current is drawn from the current sensor unit. Second, the arrangement of the capacitors 48 and 51 make the circuit act as a low-pass filter to ensure that any high-frequency noise is removed from the feedback signals 30 and 31. Finally, the output of the differential amplifier circuit is the difference between the voltage in the first feedback signal 30 and the second feedback signal 31 which is the voltage across resistor 40, also labeled as Vsense 53. Thus, the voltage at the differential amplifier circuit's output 52 represents a filtered and buffered signal measuring the current passing through the current sensor unit.

The output of the differential amplifier circuit 42 is connected to the threshold detector circuit 54 within the current limiter 21. More specifically, the output of the differential amplifier circuit 42 is connected to the positive input of a comparator 55. The negative input of the comparator is connected to the output of a voltage divider, representing the desired current level of the current limiter 21. The voltage representing the desired current level is produced by connecting a 5 volt reference voltage across a voltage divider made up of a 1.78K ohm resistor 56 and a 1.00K ohm resistor 58. This produces a voltage of 1.799 volts at the output of the voltage divider 15.

The output 57 of the comparator 55 is connected to pull-up resistor 58, which is then connected to a 15 volt source 59. When the positive input of the comparator 52 is a voltage less than the negative input of the comparator, the comparator's output will be driven to 0 volts. Alternatively, when the positive input of the comparator 52 is a voltage greater than the negative input of the comparator, the comparator's output 57 will be high impedance. The pull-up resistor 58 will be able to drive the voltage at the comparator output 57 to 15 volts.

The threshold detector circuit's output 57 is connected to the positive edge triggered input of a one-shot pulse generator 60. When in an untriggered state, the one-shot output 61 will be at logic-high. When Vsense 53 increases from a voltage lower than the desired current level to a voltage greater than the desired current level, the output of the threshold detector circuit 57 will change from a logic-low level to a logic-high level. This will be seen as a positive edge by the one-shot pulse generator 60, and will cause the one-shot pulse generator 60 to change its output 61 from logic-high to logic-low for a fixed duration of time (i.e., the pulse width).

The output 61 of the one-shot pulse generator 60 is connected to the power switch circuit 62 of the current limiter 21. More specifically, the output of the one-shot pulse generator 61 is connected to a 1.00K ohm resistor 63 which is connected to the base 73 of an NPN transistor 64. The emitter 70 of the transistor 64 is connected to ground. The collector 71 of the transistor 64 is connected to a 10K ohm resistor 65, which is connected to the gate 72 of a p-channel power MOSFET 67. The source 68 of the p-channel power MOSFET 67 is connected to the 28 volt source 19. The gate 72 of the p-channel power MOSFET is also connected to an 10K ohm resistor 66 which is connected to the 28 volt source. The drain 69 of the p-channel MOSFET is connected to the output 22 of the current limiter 21.

When the current limiter 21 is not in an overcurrent state, the voltage at the power switch circuit input 61 is logic-high, as set by the one-shot pulse generator 60. Because the base 73 of the transistor 64 draws very low current, the voltage at the base 73 will be nearly the same as the voltage at 61. Thus, the voltage at the base 73 will be approximately logic-high, which will be approximately 5 v. Since the voltage at the base 73 is more than 0.7 volts greater than the voltage at the emitter 70, the transistor 64 will be on, driving the collector 71 voltage to ground. When the collector voltage 71 approaches ground, resistors 66 and 65 make up a voltage divider between the 28 volt source 19 and ground. The voltage divider makes the voltage at the gate 72 of the p-channel power MOSFET to be 14 volts. With the gate 72 to source 68 voltage approximately 14 volts, the p-channel power MOSFET is turned on, driving the drain 69 voltage to 28 volts. The drain 69 is connected to the motor drive and control unit 23 and the test circuit 24. When the current limiter is not in an overcurrent state, it will provide the motor drive and control unit with 28 volts. The output 61 of the one-shot pulse generator 60 is also connected to a diode 37, which is the connected to the overcurrent signal output 32. The overcurrent signal output is also connected to a pull-up resistor 38 which is connected to a 5 volt source. The diode 37 is oriented such that current will not flow from the one-shot pulse generator output 61 to the overcurrent signal output 32.

The test circuit 24 has an n-channel power MOSFET 74 connected in parallel with the motor drive and control unit 23. More particularly, the drain 75 is connected to output 22 of the current limiter 21, and the source 76 is connected to the input 27 of the current sensing unit. The gate 77 of the n-channel power MOSFET 74 is connected to a pull-down resistor 78 which is connected to ground. The gate 77 is also connected to a diode 79. The diode is oriented such that the gate voltage 77 may be driven up by a high voltage at the junction 80 at the other side of the diode. Additionally, a low voltage at the junction 80 will not be able to draw current from the pull-down resistor 78. The junction 80 also connected to a pull-up resistor 81 which is connected to a 15 volt source. The junction 80 is also connected to another diode 83 which is then connected to the output 84 of an operational amplifier 85. The diode 83 at the output of the operational amplifier is oriented to only allow current to pass into the operational amplifier 85. The negative input of the operational amplifier 89 is connected to one of the feedback lines 31 from the current sensor unit 28. The operational amplifier positive input 86 is connected to the output of a voltage divider 90. The voltage divider is formed by a 5 volt reference voltage 91 connected to an 1.75K ohm resistor 87 which is connected to an 1.00K ohm resistor 88 which is connected to ground. It should be noted that the 5 v voltage reference connected to resistor 56 is a separate reference than voltage reference 91. The voltage divider produces a voltage of 1.820 volts at 90.

The run self-test input signal 34 is connected to a diode 92 which is then connected to the overcurrent output signal 32 at junction 93. The diode 92 is oriented to allow current to flow from the test circuit out to the run self-test input signal 34. At the junction 93, the diode 92 is also connected to another diode 94, which is then connected to the base 95 of an NPN transistor 99. The diode 94 is oriented to allow current to flow into the base 95. The emitter 97 of the NPN transistor 99 is connected to ground. The collector 96 is connected to pull-down resistor 81 at the junction 80.

This paragraph describes the operation of the test circuit when not running a self-test and overcurrent is not en-countered. Since the run self-test signal 34 is active low, when not running a self-test, the voltage on the run self-test signal 34 will be logic-high. In this state, because of the diode 92, the run self-test signal will not have an appreciable effect on the voltage at junction 93. When the power source is not in an overcurrent state, the current limiter's overcurrent signal 32 will be at logic-high of approximately 5 volts due to the pull-up resistor 38. This will drive the voltage at the base 95 of the NPN transistor 99 to a level high enough to activate the transistor 99. When the transistor 99 is activated, its collector 96 voltage will be pulled to ground. With the collector voltage 96 pulled to ground, the voltage at the junction 80 will also be grounded. This will, in turn, make the gate voltage 77 of the n-channel power MOSFET 74 approximately 0 volts, which will turn off the MOSFET 74. When the MOSFET 74 is off, no current will flow through the test circuit 24 from the current limiter 21 to the current sensor unit 28. It should be noted that in this state, the voltage at the junction 80 will not be affected by the output 84 of the operational amplifier 85. Since the transistor 99 is driving the junction 80 to ground, any voltage at the operational amplifier output 84 will not have an effect on the junction voltage 80 because of the diode 83 between the operational amplifier 85 and the junction 80.

This paragraph will describes the operation of test circuit when not running a self-test and overcurrent is encoun-tered. When the current limiter 21 detects that the actual current is greater than the desired current, it will drive the overcurrent signal 32 to 0 volts. This will force the voltage at junction 93 to 0 volts regardless of the run self-test signal's value because of the diode 92. With the voltage at 93 driven to 0 volts, there will be no current input to the base 95 of the NPN transistor 99. This will shut off the transistor 99 such that the collector 96 will no longer be forcing the voltage at the junction 80 to 0 volts. This allows the pull-up resistor 81 to drive up the voltage at the junction 80. A voltage divider ends up being created between the 15 volt source 82, the pull-up resistor 81 and the pull-down resistor 78, yielding a voltage of approximately 13 volts at the MOSFET gate 77. This gate voltage will turn on the n-channel power MOSFET 74, allowing the MOSFET to quickly divert the current supplied by the current limiter 21 into the test circuit 24 instead of going to the motor drive and control unit 23. Thus, the test circuit 24 helps protect the motor drive and control unit 23 by helping the current limiter 21 cut off current flow to the motor drive and control unit 23, and guarantees that the current limiter status output signal will change state rapidly.

This paragraph describes the operation of the test circuit 24 while running a self-test of the power source. A self-test of the current-limiting functionality of the power supply is initiated by making the run self-test signal 34 a logic-low of approximately 0 volts. This will also drive the voltage at junction 93 to 0 volts. With the voltage at 93 driven to 0 volts, there will be no current input to the base 95 of the NPN transistor 99. This will shut off the transistor 99 such that the collector 96 will no longer be forcing the voltage at the junction 80 to 0 volts. The pull-up resistor 81 will attempt to drive up the voltage at the junction 80 by way of a voltage divider between the 15 volt source 82, the pull-up resistor 81 and the pull-down resistor 78. This voltage divider uninhibited would create a voltage of approximately 13 volts at the MOSFET gate 77. However, the voltage at junction 80 can also be driven by the operational amplifier 85. When the feedback voltage 31 connected to the operational amplifier negative input 89 is less than the 1.820 volts at the operational amplifier positive input 86, the operational amplifier tries to drive its output 84 to a high voltage. This will cause a high voltage at the MOSFET gate 77 which will begin to turn the MOSFET 74 on. This will increase the current passing through the test circuit 24 from the current limiter 21 to the current sensor unit 28, which will then increase the feedback voltage 31 produced by the current sensor unit 28. When the feedback voltage 31 connected to the operational amplifier negative input 89 becomes greater than the 1.820 volts at the operational amplifier positive input 86, the operational amplifier will try to drive its output 84 toward ground. Equilibrium for the operational amplifier 85 is reached when approximately 1.82 amps of current is passing though the current sensor unit 28. This current level should be sufficient to cause the current limiter 21 to sense that the actual current provided by the current limiter 21 is greater than the desired current and that current should be shut off. A successful shut-off of current by the current limiter 21 is determined by the current limiter status line 35. If the current limiter does not properly operate in detecting the overcurrent condition, the self-test will fail and the user will know that the system is malfunctioning from the current limiter status line 35.

The function of the power system has several levels of fail-safe through redundancy built into the system. The use of two resistors 40 and 41 in the current sensor unit ensures that two component failures must occur for an overcurrent condition to go undetected. If the resistance of resistor 40 were to decrease in value due to some failure mechanism, the current limiter 21 would not cut off current at the desired current level. This is because the feedback voltage Vsense 53 will be a smaller magnitude than expected for the desired current level due to the resistor 40 being a de-creased resistance. However, the this would be detected during self-test operation of the test circuit since the test circuit uses only one feedback signal 31 which will properly read the current through resistor 41. Additionally, if the resistance of resistor 40 were to increase in value, the current limiter 21 would shut off current at a point lower than the desired level, which is a failsafe condition. Alternatively, if resistor 41 were to fail instead of resistor 40, the current limiter will continue to operate properly since its shut off is con-trolled by the voltage drop across of resistor 40.

The use of two voltage references also adds redundancy in the current-limiting operation of the power source. If the voltage reference 56 for the current limiter were to drift to a higher value than it is supposed to, it will be detected by the operation of test circuit 24 with its separate voltage reference 91.

The present invention contemplates that many changes and modifications may be made. Therefore, while the presently-preferred form of the improved power supply has been shown and described, and a number of alternatives discussed, persons skilled in this art will readily appreciate that various additional changes and modifications may be made without departing from the spirit of the invention, as defined and differentiated by the following claims.

What is claimed is:

1. A power supply for an electric load, comprising:
   a current limiter for supplying a desired current to said load;
   a current sensor for determining the actual current supplied by said current limiter to said load and providing a feedback signal to said current limiter for causing said current limiter to reduce the error between said desired current and the actual current supplied to said load; and
   a test circuit arranged to be selectively activated while current is supplied to said load for temporarily increasing the actual current sensed by said current sensor to a level above said desired current for causing said current limiter to temporarily adjust the magnitude of the actual current supplied to said load such that the operational integrity of said power supply is tested while current is supplied to said load by determining that the actual current provided by said current limiter is temporarily shut off in response to the operation of said test circuit.

2. The power supply of claim 1, wherein said current sensor includes at least one resistor.

3. The power supply of claim 1, wherein said current sensor produces more than one feedback signal.

4. The power supply of claim 3, wherein said current limiter includes a differential amplifier configured to measure the difference between two of said feedback signals.

5. The power supply of claim 1, wherein said current limiter includes a first transistor.

6. The power supply of claim 5, wherein said current limiter further includes a second transistor for driving said first transistor.

7. The power supply of claim 1, wherein said current limiter includes a comparator circuit.

8. The power supply of claim 7, wherein said current limiter further includes a reference voltage as an input to said comparator circuit.

9. The power supply of claim 1, wherein said current limiter includes a pulse generator configured to shut off said power supply for a period of time if said actual current is greater than said desired current.

10. The power supply of claim 1, further including a low-pass filter configured to filter said current sensor feedback signal.

11. The power supply of claim 1, wherein said test circuit includes a transistor.

12. The power supply of claim 11, wherein said transistor of said test circuit is configured to rapidly ground said electrical load when said actual current is greater than said desired current.

13. The power supply of claim 1, wherein said test circuit includes an operational amplifier circuit.

14. The power supply of claim 13, wherein said operational amplifier circuit includes a reference voltage.

15. The power supply of claim 1, wherein said electric load is an electric motor.

16. The power supply of claim 15, including a torque sensor configured to measure the torque output of said electric motor and provide a second feedback signal to said current limiter for causing said current limiter to adjust its current output if said second feedback signal is not within a desired range.

17. A method of operating a power supply to an electric load, said power supply having a current limiter for supplying a desired current to said load and having a current sensor for determining the actual current supplied by said current limiter to said load and providing a feedback signal to said current limiter for causing said current limiter to reduce the error between said desired current and the actual current supplied to said load, comprising the steps of:
providing a test circuit;
selectively operating said test circuit while current is supplied to said load to temporarily increase the actual current sensed by said current sensor to a level above said desired current; and
determining that the current limiter adjusts in response to operation of said test circuit by determining that the actual current supplied to said load is temporarily shut off in response to the operation of said test circuit;
thereby to test the operational integrity of said power supply.

18. The method of claim 17, wherein the step of providing a test circuit includes the step of placing a transistor in parallel with said electric load.

19. The method of claim 17, wherein the step of providing a test circuit includes using an operational amplifier circuit with feedback to control said operation of said test circuit.

20. The method of claim 17, wherein the step of operating said test circuit further includes the steps of:
providing a reference voltage;
comparing said reference voltage to said feedback signal to provide a result; and
adjusting the current flowing to said current sensor as a function of said result.

21. The method of claim 18, wherein the step of providing said test circuit further includes the step of:
operating said transistor of said test circuit when said actual current is greater than said desired current in order to rapidly reduce the electrical drive to said electrical load.

22. The method of claim 17, wherein the electric load includes an electric motor and further including the steps of:
measuring the output torque of said electric motor with a torque sensor;
providing a second feedback signal from said torque sensor to said current limiter; and
adjusting the current flowing from said current limiter as a function of said second feedback signal.

* * * * *